UNITED STATES PATENT OFFICE.

PHILIPP EYER, OF HALBERSTADT, GERMANY, ASSIGNOR TO THE FIRM OF RUDOLPH KOEPP & CO., OF OESTRICH-ON-THE-RHINE, GERMANY.

PRODUCTION OF ANTIMONATES.

1,211,564.

Specification of Letters Patent. Patented Jan. 9, 1917.

No Drawing. Application filed July 21, 1915. Serial No. 41,198.

*To all whom it may concern:*

Be it known that I, PHILIPP EYER, a subject of the German Emperor, and resident of Halberstadt, Germany, have invented certain new and useful Improvements in the Production of Antimonates, of which the following is a specification.

My invention relates to the production of antimonates and to their utilization in the art of making enamels.

It has been proposed before to produce compounds of antimonic acid and oxides of the alkaline earths or the like by heating at higher temperatures a combination of the respective base which gives off volatile acid at high temperature, with antimony oxid or compounds yielding antimony oxid, or else by heating to a high temperature oxids of antimony and of the base to be combined therewith in the presence of such acids as will volatilize during this treatment and leave behind the metal oxids. However experiments have shown that this method does not furnish good results; the products obtained at the high temperatures employed are more or less discolored and in some cases stony.

I have now ascertained that very pure antimonates of white color and great volume can be obtained by heating to a high temperature the oxids of antimony and of the bases to be combined therewith in the presence of ammonium nitrate. The nitrate is completely volatilized during this treatment; it acts as an oxidizing medium and prevents the particles from compacting into a hard solid body. It also seems to exert other favorable effects, which have not been ascertained before. By aid of this method antimonates of all kinds of bases such as the alkaline earths, aluminium, magnesium, zinc, tin, zirconium, beryllium and the like can be produced.

Special advantages are obtained if an excess of the metal oxid is used. Of course by simultaneously heating oxids of different metals mixtures of antimonates can be produced.

The oxids can be replaced by such compounds as will be converted during the treatment mentioned into the oxids, such compounds being for instance the carbonates.

Example 1: Molecular quantities of antimony oxid and magnesium oxid are mixed with a suitable quantity of ammonium nitrate, and the mixture is then heated to a high temperature, say between 800 and 1000 degr. C.

Example 2: 70 parts of antimony oxid, 50 parts of zinc oxid and 25 parts of ammonium nitrate are heated to red heat in the muffle furnace, until the vapors have ceased to escape.

Example 3: 30 parts of zirconium oxid, 70 parts of antimony oxid, 10 parts of magnesium carbonate and 25 parts of ammonium nitrate or 70 parts of antimony oxid, 50 parts of tin oxid and 10 parts of clay are heated to red heat in the muffle furnace, until the vapors have ceased to escape.

As shown in the examples, the components can be heated in dry mixture, or some or all of them may react upon each other in a liquid state. Thus for instance antimony oxid and the metal oxid to be combined therewith may be used as solids, while the ammonium nitrate may be used in liquid state. The products obtained in all cases are very voluminous, white colored and non-poisonous and show a great resistance against the action of acids.

Experiments have shown that the antimonates produced after this method, and more especially the antimonates of magnesium and zinc, are excellent media for clouding glasses, and in the first line enamels.

I am aware that it has been proposed to use the sodium metantimonate sold under the name of Leukonin for clouding enamels. The said product however easily produces blisters, burns out and, if added in the grinding mill, impairs the capacity of spreading of the enamel. The antimonates produced according to this invention do not present these drawbacks. They do not produce any blisters in the enamels, they cover better and augment the spreading capacity of the enamel. The antimonates obtained with an excess of bases are especially suited as clouding media. In order to obtain these latter products, an excess of the metal oxid to be combined with the antimonic acid according to Example 2 may be used, or else, as shown in Example 3, besides the metal oxid to be combined with the antimony oxid a second or even a third metal oxid may be added. The clouding media thus obtained can be further varied and improved by adding to them other suitable clouding and covering agents.

I claim:—

1. The method of producing metal antimonates which consists in mixing an antimony oxid and a metal oxid other than an alkali metal oxid with ammonium nitrate and heating the mixture to volatilize the ammonium nitrate.

2. The method of producing metal antimonates which consists in mixing a compound yielding an antimony oxid and a metal oxid other than an alkali metal oxid with ammonium nitrate and heating the mixture to volatilize the ammonium nitrate.

3. The method of producing metal antimonates, which consists in mixing an antimony oxid and a compound yielding a metal oxid other than an alkali oxid with ammonium nitrate and heating the mixture to volatilize the ammonium nitrate.

4. The method of producing metal antimonates, which consists in mixing a compound yielding an antimony oxid and a compound yielding a metal oxid other than an alkali oxid with ammonium nitrate and heating the mixture to volatilize the ammonium nitrate.

5. The method of producing metal antimonates, which consists in mixing an antimony oxid and a metal oxid other than an alkali metal oxid, said metal oxid being in excess, with ammonium nitrate and heating the mixture to volatilize the ammonium nitrate.

6. The method of producing metal antimonates, which consists in mixing a compound yielding an antimony oxid and a metal oxid other than an alkali metal oxid, said metal oxid being in excess, with ammonium nitrate and heating the mixture to volatilize the ammonium nitrate.

7. The method of producing metal antimonates, which consists in mixing an antimony oxid and a metal compound yielding a metal oxid other than an alkali oxid, said metal compound being in excess, with ammonium nitrate and heating the mixture to volatilize the ammonium nitrate.

8. The method of producing metal antimonates, which consists in mixing an antimony compound yielding an antimony oxid and a metal compound yielding a metal oxid other than an alkali oxid, said metal compound being in excess, with ammonium nitrate and heating the mixture to volatilize the ammonium nitrate.

9. The method of producing metal antimonates, which consists in mixing an antimony oxid and a magnesium oxid with ammonium nitrate and heating the mixture to volatilize the ammonium nitrate.

10. The method of producing metal antimonates, which consists in mixing an antimony oxid and a compound yielding magnesium oxid with ammonium nitrate and heating the mixture to volatilize the ammonium nitrate.

11. The method of producing metal antimonates, which consists in mixing an antimony oxid and a magnesium oxid, said magnesium oxid being in excess, with ammonium nitrate and heating the mixture to volatilize the ammonium nitrate.

12. The method of producing metal antimonates, which consists in mixing an antimony oxid with a compound yielding magnesium oxid, said magnesium oxid being in excess, with ammonium nitrate and heating the mixture to volatilize the ammonium nitrate.

13. A metal antimonate suitable for use as a clouding medium for enamels produced by mixing an antimony oxid and a metal oxid other than an alkali metal oxid with ammonium nitrate and heating the mixture to volatilize the ammonium nitrate, said antimonate being white colored, non-poisonous and having a great resistance to the action of acids.

14. A metal antimonate suitable for use as a clouding medium for enamels produced by mixing an antimony oxid and a magnesium oxid with ammonium nitrate and heating the mixture to volatilize the ammonium nitrate, said antimonate being white colored, non-poisonous and having a great resistance to the action of acids.

In testimony whereof I have signed my name to this specification in the presence of two subscribing witnesses.

PHILIPP EYER.

Witnesses:
 JEAN GRUND,
 CARL GRUND.